United States Patent
Singh et al.

(10) Patent No.: US 8,190,537 B1
(45) Date of Patent: May 29, 2012

(54) FEATURE SELECTION FOR LARGE SCALE MODELS

(75) Inventors: Sameer Singh, Amherst, MA (US);
Eldon S. Larsen, McMurray, PA (US);
Jeremy Kubica, Wexford, PA (US);
Andrew W. Moore, Pittsburgh, PA (US)

(73) Assignee: Google Inc., Mountain View, CA (US)

( * ) Notice: Subject to any disclaimer, the term of this patent is extended or adjusted under 35 U.S.C. 154(b) by 741 days.

(21) Appl. No.: 12/263,008

(22) Filed: Oct. 31, 2008

(51) Int. Cl.
*G06F 15/18* (2006.01)

(52) U.S. Cl. ......................................................... 706/12

(58) Field of Classification Search ........................ None
See application file for complete search history.

(56) References Cited

U.S. PATENT DOCUMENTS

| | | | | |
|---|---|---|---|---|
| 6,973,459 | B1 * | 12/2005 | Yarmus | 707/778 |
| 2005/0234688 | A1 * | 10/2005 | Pinto et al. | 703/6 |
| 2007/0260520 | A1 * | 11/2007 | Jha et al. | 705/14 |

OTHER PUBLICATIONS

Abe, Shigeo, "Modified Backward Feature Selection by Cross Validation," ESANN'2005 proceedings . . . European Symposium on Artificial Neural Networks Bruges (Belgium) Apr. 27-29, 2007, d-side public., ISBN 2-930307-05-6. pp. 163-168.
Balakrishnan, Suhrid and Madigan, David. "Algorithms for Sparse Linear Classifiers in the Massive Data Setting." 2007, Journal of Machine Learning Research. pp. 1-26.
Buja, Andreas et al. "Linear Smoothers and Additive Models." 1989, The Annals of Statistics, vol. 15, No. 2. pp. 453-510.
Dash M., and Liu H. "Feature Selection for Classification," 1997. Intelligent Data Analysis. Elsevier Science B.V. pp. 131-156.
Eyheramendy, Susana and Madigan, David. "A novel feature selection score for text categorization.", Proceedings of the Workshop on feature Selection for Data Mining: Interfacing Machine Learning and Statistics. Apr. 23, 2005. 8 Pages.
Fleuret, Francois. "Fast Binary Feature Selection with Conditional Mutual Information." (2004). Journal of Machine Learning Research, pp. 1531-1555.
Friedman, Jerome H. and Stuetzle, Werner. "Projection Pursuit Regression." Feb. 1980. Department of Energy, Contract No. DE-AC03-76SF00515. 30 Pages.
John, George et al. "Irrelevant Features and the Subset Selection Problem." 1994, Morgan Kaufmann Publishers, San Francisco, CA. 9 Pages.
Kira, Kenji and Rendell, Larry A. "The Feature Selection Problem: Traditional Methods and a New Algorithm." AAAI-92 Proceedings, 1992. pp. 129-134.
Krishnapuram, Balaji, et al. "Joint Classifier and Feature Optimization for Comprehensive Cancer Diagnosis Using Gene Expression Data." Journal of Computational Biology, vol. 11, Nos. 2-3, 2004, pp. 227-242.

(Continued)

*Primary Examiner* — Jeffrey A Gaffin
*Assistant Examiner* — Luis Sitiriche
(74) *Attorney, Agent, or Firm* — Fish & Richardson P.C.

(57) ABSTRACT

Disclosed are a method and system for receiving a plurality of potential features to be added to a model having existing features. For each of the potential features, an approximate model is learned by holding values of the existing features in the model constant. The approximate model includes the model having existing features and at least the potential feature. A performance metric is computed for evaluating performance of the approximate model. The performance metric is used to rank the potential feature based on a predetermined criterion.

20 Claims, 7 Drawing Sheets

OTHER PUBLICATIONS

Perkins, Simon and Theiler, James. "Online Feature Selection using Grafting." 2003. Proceedings of the Twentieth International Conference on Machine Learning (ICML—2003) Washington, DC. 8 Pages.

Pietra, et al. "Inducing Features of Random Fields." May 1995. School of Computer Science, Carnegie Mellon University. pp. 1-34.

Singh et al., "Parallel Large Scale Feature Selection for Logistic Regression." KDD 2008.

Tibshirani, Robert. "Regression Shrinkage and Selection via the Lasso." 1996, Journal of the Royal Statistical Society. vol. 58, No. 1. pp. 267-288.

Whitney, Wayne A. "A Direct Method of Nonparametric Measurement Selection." IEEE Transactions on Computers, Sep. 1971. pp. 1100-1103.

Almuallim., Hussein and Dietterich. Thomas G. "Learning with Many Irrelevant Features." Department of Computer Science, Oregon State University. 6 Pages.

McCallum, Andrew. "Efficiently Inducing Features of Conditional Random Fields." Computer Science Department. University of Massachusetts Amherst. 8 Pages.

* cited by examiner

FEATURE SELECTION FOR LARGE SCALE MODELS

BACKGROUND

This disclosure relates to machine learning.

In recent years, machine-learning approaches for data analysis have been widely explored for recognizing patterns which, in turn, allow extraction of significant information contained within large datasets. Learning algorithms include models that may be trained to generalize using data with known outcomes. Trained learning machine algorithms may then be applied to predict the outcome in cases of unknown outcome, i.e., to classify the data according to learned patterns.

In data mining problems, features (i.e., quantities that describe the data in a model), are typically selected from a pool of features. The choice of which features to use in the model can have a significant effect on the accuracy of the learned model. Peculiar problems arise when the number of features is large, e.g., thousands of genes in a microarray. For example, data-overfitting may occur if the number of training records, e.g., number of patients, is smaller compared to the number of genes. In some situations, the large number of features can also make the learning model expensive and labor intensive.

SUMMARY

In one aspect, a method includes receiving a plurality of potential features from a set of data records corresponding to a model having existing features. For each of the potential features, an approximate model is learned by holding values of the existing features in the model constant, the approximate model including the model having existing features and at least the potential feature. A performance metric is computed for evaluating a performance of the approximate model, and the performance metric is used to rank the potential feature based on a predetermined criterion.

The following are examples within the scope of this aspect.

Learning the approximate model includes deriving an estimated coefficient for the potential feature by computing a maximum likelihood measure as a function of values of predicted probabilities and observed outcomes corresponding to the model. The method includes deriving in parallel estimated coefficients for a predetermined set of the potential features. The method includes, for each non-binary categorical feature, transforming the feature into a feature class having a plurality of independent binary features. The method includes selecting only records containing the potential feature, from the set of data records. The approximate model is computed using a one dimensional heuristic single feature optimization over the potential feature to estimate an optimum coefficient corresponding to the potential feature.

The performance metric is selected from a group consisting of an area under curve metric, a log-likelihood measure, and a measure of prediction error. The method includes forming a histogram over values of predicted probabilities associated with the plurality of potential features corresponding to the predetermined set of data records, and learning the approximate model based on the histogram. Each bin in the histogram tracks a first number of data records in a predetermined range of values of predicted probabilities. Each bin in the histogram tracks a second number of data records having positive outcomes from the first number of data records, the positive outcomes determined by values of predicted probabilities being substantially equal to one.

In another aspect, a method of evaluating potential features to be added to a model having existing features includes, for each data record of a plurality of data records associated with the model, computing a value of predicted probability for the model based on the existing features, and storing the value of the predicted probability along with an observed outcome of the model for each potential feature in an intermediate data set. The method includes, for each potential feature, based on the values of the predicted probability and the observed outcome in the intermediate data set, computing an estimated coefficient for the potential feature by optimizing a maximum likelihood measure over the potential feature, and deriving an approximate model using the estimated coefficient, the approximate model including the model having existing features and at least the potential feature. The potential features are scored based on performance metrics of the approximate models.

The following are examples within the scope of this aspect.

The method includes, for each potential feature, computing a difference between a log-likelihood measure of the approximate model and a log-likelihood measure of the model. Computing the value of the predicted probability for the model based on the existing features is carried out in parallel over the plurality of data records. Computing the estimated coefficient for the potential feature is carried out in parallel over the potential features. The method includes, for each potential feature, computing a new predicted probability of the approximate model. The method includes aggregating the differences between the log-likelihood measure of the approximate model and the log-likelihood measure of the model, of all the potential features in a feature class.

In another aspect, a method includes providing a model having existing features that have been trained and produce a first accuracy when the model is used to predict an outcome, and evaluating a plurality of approximate models, each including one or more potential features, each approximate model including the model and the one or more potential features, where the existing features are held constant and the one or more potential features are trained, where evaluating includes determining a second accuracy one for each of the approximate models.

In another aspect, the method includes scoring the one or more potential features based on performance metrics of the approximate models. The method includes providing a machine learning model, the model having a plurality of existing features and features being trained including setting values for one or more coefficients associated with each of the existing features, identifying a plurality of potential features, fixing the model including maintaining values for the coefficients associated with the existing features, adding one or more first potential features to the model including training the first potential features to create a first new model, and determining a first performance metric associated with the first new model, adding one or more second potential features to the model including training the second potential features to create a second new model, and determining a second performance metric associated with the second new model; and comparing the first performance metric with the second performance metric, and ranking the first and second potential features based on the comparing.

Other aspects include other combinations of the features recited above and other features, expressed as methods, apparatus, systems, computer-readable media, program products, and in other ways. Other features and advantages will be apparent from the description and from the claims.

DESCRIPTION

Figure 1:
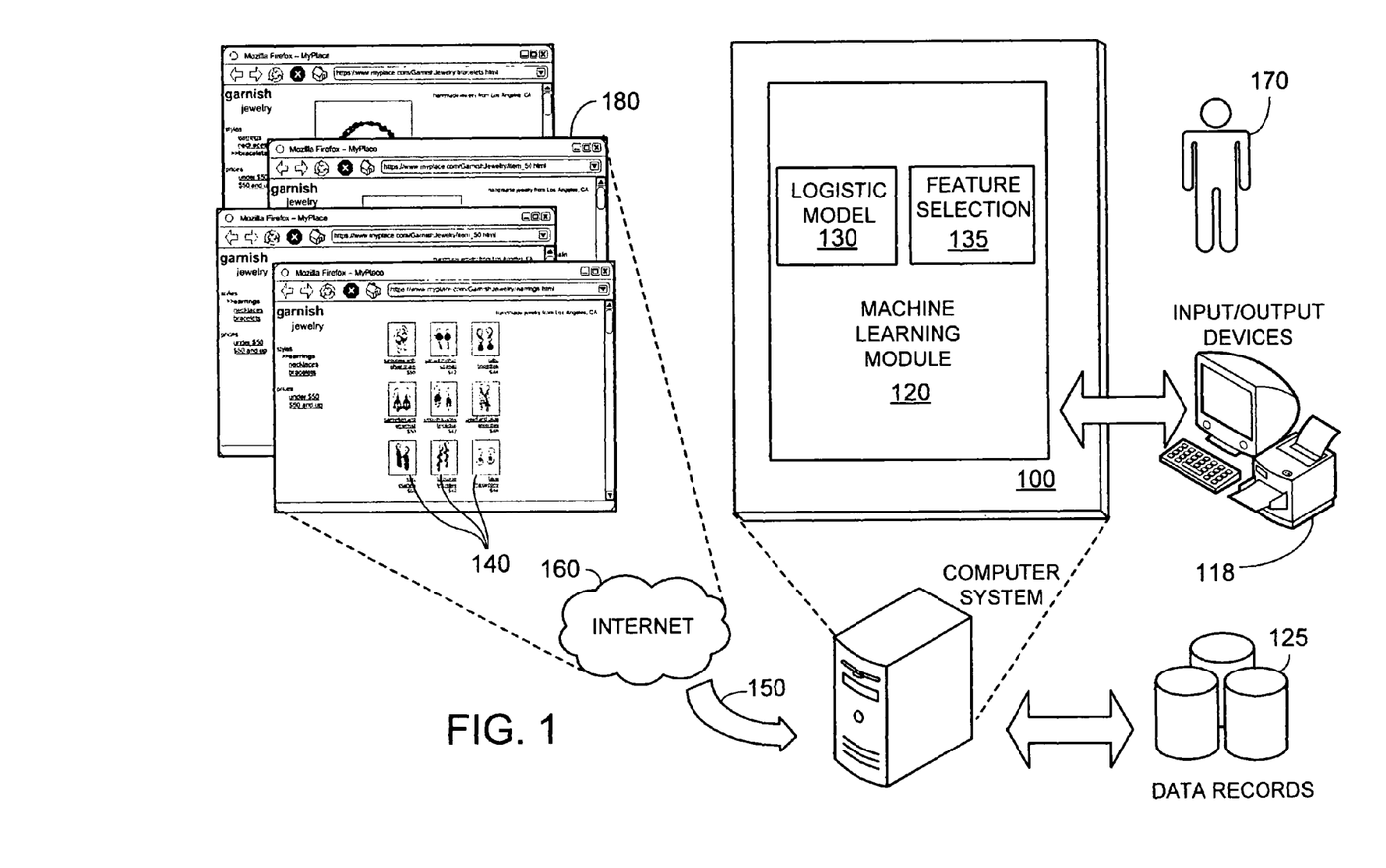
FIG. 1 is a block diagram of an example computer system implementing a machine learning module.

FIG. 1 is a block diagram of an example computer system 100 configured to implement a machine learning module 120. The machine learning module 120 includes software for executing methods in accordance with example aspects of a logistic regression model 130 (also simply referred to as a logistic model 130) described in detail below.

An underlying data set, i.e., data records 125, on which the logistic model 130 is run, may include a large number of instances. Each instance, in turn, may have values for many attributes. However, not all the attributes are relevant to defining characteristics of an instance. Accordingly, the attributes need to be screened (i.e., evaluated and ranked) to identify relevant attributes. Along these lines, in some examples, a feature selection component 135 is provided for selecting the most desirable attributes, i.e., "features," from a pool of attributes, or potential features that are to be added to the logistic model 130.

In general, the logistic model 130 is described by a vector of coefficients or "parameters" (i.e., weights assigned to each feature in the model 130). A value of a predicted probability (e.g., a probability whether an event occurs) of an event is computed based on the vector of coefficients. To evaluate the performance of the logistic model 130, the value of the predicted probability is compared with an observed, or "actual" outcome, e.g., either 1 or 0, depending on whether an event occurs (e.g., an actual value for an instance).

An aspect of the feature selection component 135 is that the features to be included in the logistic model 130 can be determined, or "trained," without having to re-learn the entire logistic model 130 for each potential feature. Accordingly, potential or "candidate" features for the logistic model 130 are evaluated and ranked based on their estimated effect on the performance of a newly learned approximate model.

For each new feature being evaluated, the approximate model is derived based on a process that is similar to a single iteration of back-fitting (i.e., relearning the model by holding the existing features constant), and a value of a coefficient corresponding to the new feature is evaluated. In this manner, the approximate model provides a fast and accurate estimate of each new feature's coefficient in the logistic model 130. The approximate model is analyzed to determine performance metrics for the model. In some examples, performance metrics such as loglikelihood measures are used to determine the approximate model's performance. Other performance metrics, including mean-squared-error, area-under-curve metrics, and absolute error, can also be used. Finally, in some examples, the new features are ranked based on the performance metrics.

One aspect of the feature selection component 135 is that the evaluation and ranking of the potential features can be performed in parallel over both data records and potential features, allowing for evaluation of many (e.g., billions) of potential features. For example, as described in further detail below, the logistic model 130 can be run in the context of a map-reduce framework described in the paper, "Mapreduce: Simplified data processing on larger clusters," by Dean, J., and Ghemawat, S, presented at the Sixth Symposium on Operating System Design and Implementation, in San Francisco, Calif. in 2004. Accordingly, values of predicted probabilities and observed outcomes corresponding to the potential features can be determined in parallel for data records associated with the logistic model 130. Subsequently, approximate models to score the potential features are derived in parallel for the potential features based on the values of predicted probabilities and observed outcomes.

As shown in FIG. 1, in some examples, the logistic model 130 can be adapted to run on data associated with Internet images 140. Accordingly, the computer system 100 is connected over, e.g., wired or wireless network 150, to the Internet 160. Typically, the Internet 160 is presented to users 170 of the computer system 100 in the form of web browser pages 180 having Internet images 140. Users 170 may wish to enhance their browsing experience by filtering out Internet images 140 that are advertisements from the web browser pages 120. Accordingly, the logistic model 130 can be used to identify whether an Internet image 140 is an Internet advertisement based on a set of predetermined features.

In some examples, the logistic model 130 can be adapted to determine whether, for example, an incoming e-mail message is spam based on predetermined features of the incoming message.

In some examples, the logistic model 130 can be adapted to receive, for example, data points associated with specimen mushrooms, and determine whether a specimen is poisonous based on predetermined features of the specimen.

In some examples, the logistic model 130 can be adapted to receive, for example, data points associated with articles on a range of topics. The logistic model 130 can determine categories of topics (e.g., economics) for the articles, based on stemmed tokens (e.g., "deficit," "budget") from the articles.

It is understood that various implementations of the logistic model 130 can be adapted to other situations.

Figure 2:
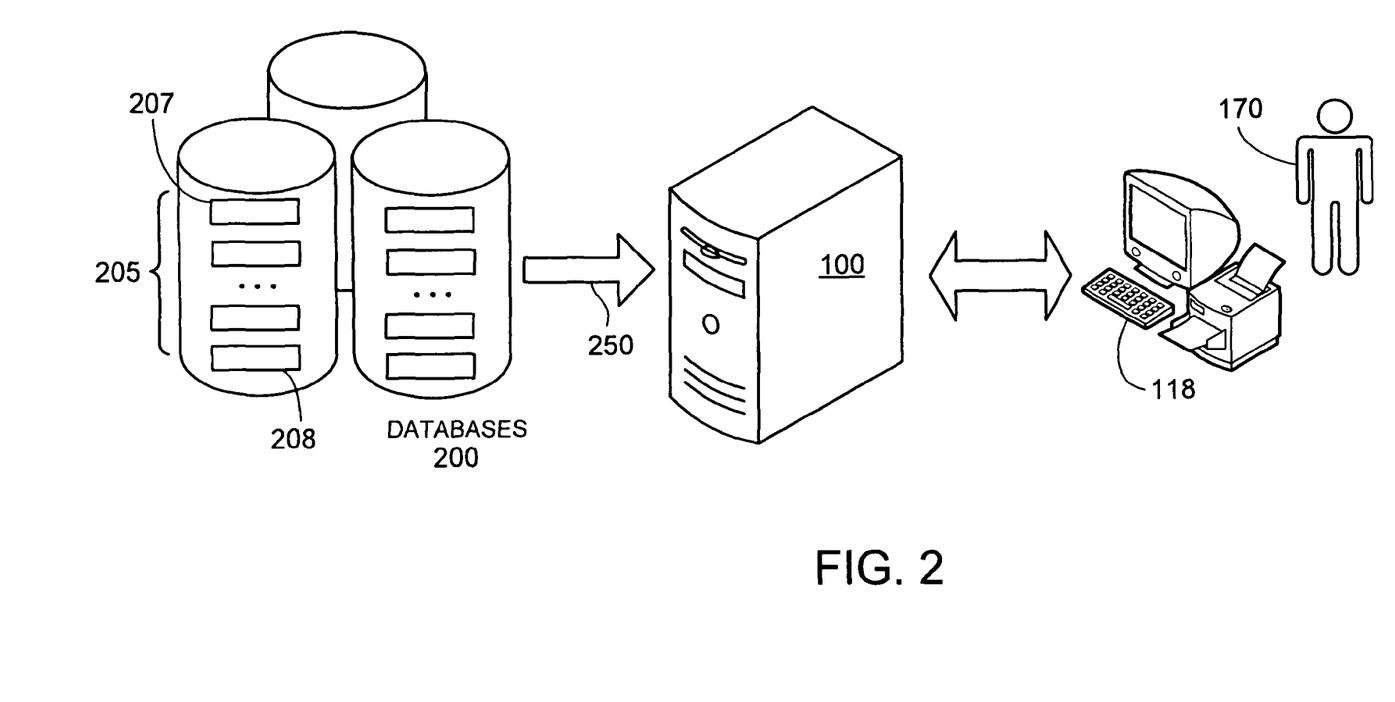
FIG. 2 is a block diagram of an example computer system connected to databases.

As shown in FIG. 2, in some examples, the data points may be contained in data records 205 that are stored in databases 200. The databases 200 can be local to the computer system 100, or remotely accessed over, e.g., wired or wireless network 250 by the computer system 100.

As described above, each data record 205 includes values for features corresponding to an instance in an underlying data set. For example, in the specimen mushrooms example, each data record 205 may include information about a specific instance of a specimen mushroom, such as, values for "odor," "gill color," "ring type," or "stalk-surface-above-rim."

In some examples, the data records 205 include training data records 207. The logistic model 130 is run on the training data records 207 before being run on the rest of the data records 205. The training data records 207 may include additional information about actual outcomes corresponding to the instances in the data records 205. In some examples, the training data records 207 may further include potential features to be added to the logistic model 130.

For example, a training data record 207 may include an actual outcome field, $y_i$, which can be either 1 or 0, indicating whether a specific instance of a specimen mushroom is poisonous. In this manner, a predicted probability of the logistic model 130 can be compared with the actual outcome to measure performance of the logistic model 130.

In some examples, the data records 205 also include evaluation data records 208. The evaluation data records 208 can also include potential features to be added to the logistic model 130. In some examples, the evaluation data records 208 also include additional information about actual outcomes corresponding to the instances in the data records 205. As described below, in some examples, the feature selection component 135 evaluates and ranks the potential features in the evaluation data records 208.

Figure 3:
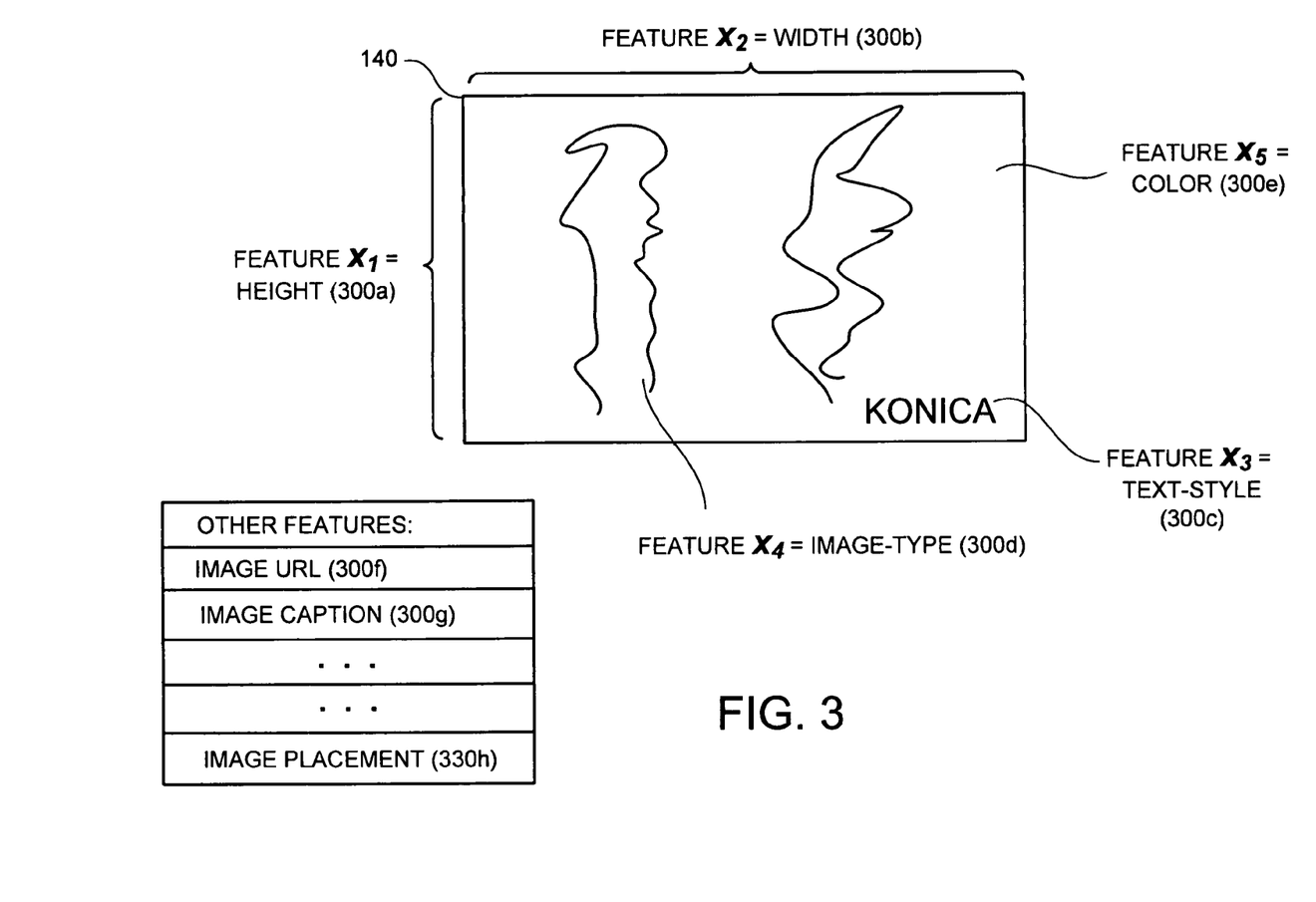
FIG. 3 is an example Internet image.

Returning now to the example of Internet images 140, as shown in FIG. 3, features 300a-h, collectively 300 (mathematically represented as a vector, $\vec{x}$), are drawn from a pool of potential features that are attributes of the underlying Internet image 140. Features 300 may include attributes of an Internet image 140, such as image height 300a, image width 300b, image caption, image text style 300c, image type 300d, image color 300e, and image universal resource locator (URL) 300f.

In some implementations, in the logistic model 130, values of features 300 are assumed to be binary. Non-binary features may be transformed into binary values using techniques known to those skilled in the art. For example, non-binary categorical features may be transformed using an "exploding" technique, i.e., for each value of the non-binary categorical feature a new Boolean feature is created that is true if and only if the original feature had that value. For example, if the non-binary categorical feature was "car_color" then the Boolean features derived using this technique are "car_color_red," "car_color_blue," etc. Accordingly, using this technique a "feature class" having, e.g., k disjoint binary features is created in which each binary feature corresponds to a discrete value of the non-binary categorical feature. In some examples, the same technique may be applied to continuous features.

As described above, the logistic model 130 is described by a vector of coefficients, $\vec{\beta}$, or weights assigned to each feature 300 in the logistic model 130. The value of a predicted probability, p, of an event, e.g., probability whether the Internet image 140 is an Internet advertisement, is computed based on the logistic model 130. To evaluate the performance of the logistic model 130, the value of the predicted probability, p, is compared with the observed outcome y, which can have a value of 1 or 0, depending on whether the Internet image 140 is actually an Internet advertisement. The logistic model 130 represents log odds of the event as a linear model given in equation (1) below.

$$\log\left(\frac{p}{1-p}\right) = \vec{\beta} \cdot \vec{x} \tag{1}$$

Expression (1) above is equivalent to the representation of p, shown below as equation (2).

$$p = P(y=1) = f(\vec{x}, \vec{\beta}) = \frac{e^{\vec{x} \cdot \vec{\beta}}}{1 + e^{\vec{x} \cdot \vec{\beta}}} \tag{2}$$

The vector of coefficients, $\vec{\beta}$, is typically learned by optimizing the data's unpenalized loglikehood function as shown by expressions (3) and (4) below.

$$L(X, \vec{\beta}) = \sum_{i=1}^{N} \left( y_i \ln f(\vec{x}_i, \vec{\beta}) + (1-y_i) \ln(1 - f(\vec{x}_i, \vec{\beta})) \right) \tag{3}$$

$$\vec{\beta}_{opt} = \underset{\vec{\beta}}{\operatorname{argmax}} \sum_{i=1}^{N} \left( y_i \ln(\vec{x}_i, \vec{\beta}) + (1-y_i) \ln(1 - f(\vec{x}_i, \vec{\beta})) \right) \tag{4}$$

Figure 4:
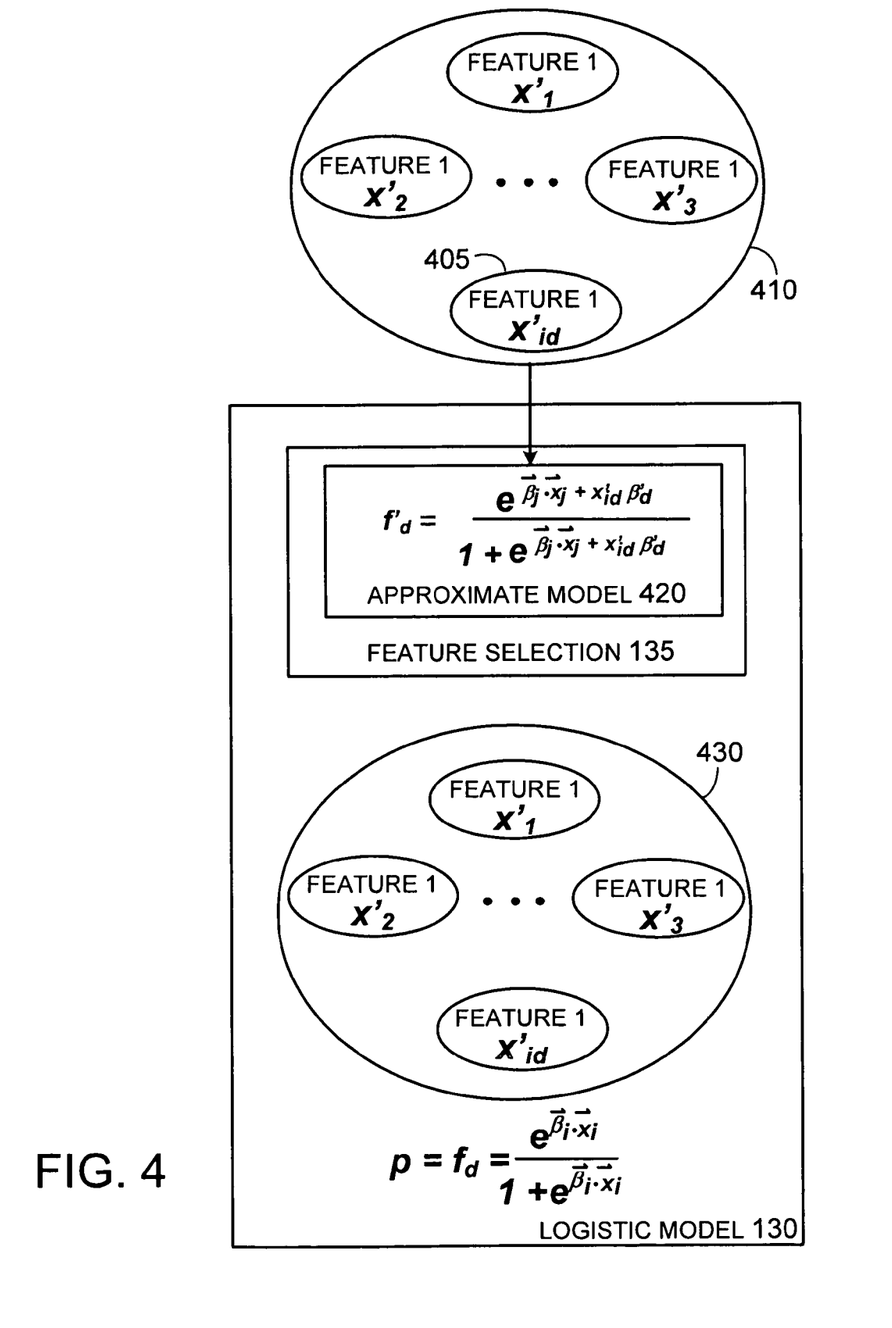
FIG. 4 is an example block diagram showing feature selection.

Referring now to FIG. 4, the feature selection component 135 evaluates a new feature 405, $x'_d$, from a pool of potential features 410 ($x'_1, x'_2, \ldots$). In some examples, the pool of potential features 410 are contained in training and evaluation data records 205 in databases 200.

The logistic model 130, $f_d$, (having an associated predicted probability, p) is described by existing features ($x_1, x_2, \ldots$). The feature selection component 135 uses an optimization process for determining whether the new feature 405 $x'_d$, should be added to the logistic model 130. For example, the feature selection component 135 uses a single feature optimization (SFO) process. As described in detail below, in the SFO process, each potential feature 410 is evaluated and ranked based on its estimated effect on performance of a newly learned approximate model 420.

The approximate model 420 is derived for each new feature 405, $x'_d$, being evaluated by re-learning the logistic model 130 over the new feature 405, while holding the existing features 430 constant. A value of an estimated coefficient, $\beta'_d$, corresponding to the new feature 405, $x'_d$, is determined based on the approximate model 420. For example, the estimated coefficient $\beta'_d$ can be determined by maximizing the loglikelihood of the data corresponding to the new feature 405 as shown by expression (5).

$$\underset{\beta'_d}{\operatorname{argmax}} \sum_{i=1}^{N} \left( y_i \ln f_d(\vec{x}_i, \vec{\beta}) + (1-y_i) \ln(1 - f_d(\vec{x}_i, \vec{\beta})) \right) \tag{5}$$

As shown in FIG. 4, $f_d(\vec{x}_i, \vec{\beta})$ denotes the newly learned approximate model 420 over the existing features 430 and the new feature 405. The approximate model 420 is given by expression (6) below.

$$f_d(\vec{x}_i, \vec{\beta}) = \frac{e^{\vec{\beta} \cdot \vec{x}_i + x'_{id} \beta'_d}}{1 + e^{\vec{\beta} \cdot \vec{x}_i + x'_{id} \beta'_d}} \tag{6}$$

In this manner, an approximate model 420 is derived for each potential feature 405 in the pool of potential features 410. The approximate model 420 provides a fast and accurate estimate of the potential feature's 405 coefficient in the logistic model 130. As described below, the approximate model 420 is analyzed to determine performance metrics for the approximate model 420. In some implementations, the potential features 410 are ranked based on the performance metrics.

In some examples, Newton's method is used for maximizing the loglikelihood function in equation (5) to achieve an optimum value of the estimated coefficient, $\beta'_d$. Accordingly, as shown in expression (7), a first derivative of the loglikelihood function is set to zero.

$$\frac{\partial L}{\partial \beta'_d} = 0 \tag{7}$$

Starting at $\partial \beta'_d = 0$, the value of $\beta'_d$ is iteratively updated using expression (8) below until convergence is achieved.

$$\beta'_d = \beta'_d - \frac{\frac{\partial L}{\partial \beta'_d}}{\frac{\partial^2 L}{\partial \beta'^2_d}} \tag{8}$$

Applying the above functions in expressions (7) and (8) to the function in expression (5), expressions (9) and (10) are achieved.

$$\frac{\partial L}{\partial \beta'_d} = \sum_{i=1}^{N} x'_{id}\left(y_i - f_d(\vec{x}_i, \vec{\beta})\right) \quad (9)$$

$$\frac{\partial^2 L}{\partial \beta'^2_d} = -\sum_{i=1}^{N} x'^2_{id} f_d(\vec{x}_i, \vec{\beta})\left(1 - f_d(\vec{x}_i, \vec{\beta})\right) \quad (10)$$

The above technique for optimizing the estimated coefficient, $\beta'_d$, corresponding to a new feature 405, can be used with other objective functions for optimizing the estimated coefficient, $\beta'_d$, known to those skilled in the art. For example, applying the above technique to an L2-regularization objective function having an additional penalty term, $\lambda \beta'^2_d$, the loglikelihood function changes form to that as shown in expression (11).

$$\sum_{i=1}^{N}\left(y_i \ln f_d(\vec{x}_i, \vec{\beta}) + (1 - y_i)\ln\left(1 - f_d(\vec{x}_i, \vec{\beta})\right)\right) - \lambda \beta'^2_d \quad (11)$$

Accordingly, the derivative expressions are given by expressions (12) and (13).

$$\frac{\partial L}{\partial \beta'_d} = \sum_{i=1}^{N} x'_{id}\left(y_i - f_d(\vec{x}_i, \vec{\beta})\right) - 2\lambda \beta'_d \quad (12)$$

$$\frac{\partial^2 L}{\partial \beta'^2_d} = -\sum_{i=1}^{N} x'^2_{id} f_d(\vec{x}_i, \vec{\beta})\left(1 - f_d(\vec{x}_i, \vec{\beta})\right) - 2\lambda \quad (13)$$

In some implementations, a different metric of the logistic model 130 can be optimized. For example, a squared error measure of the logistic model 130 can be optimized.

In some examples, as described above, the feature selection component 135 uses the single feature optimization process. The single feature optimization process can be described as a "cascaded" model, where a current model's activation, "a," which is a dot product of the vector of coefficients and a vector of features of the current model as indicated in expression (14) below, is fed into a later stage logistic model 130 as a feature.

$$a_i = \vec{\beta} \cdot \vec{x}_i = \log\left(\frac{f(\vec{x}_i, \vec{\beta})}{1 - f(\vec{x}_i, \vec{\beta})}\right) \quad (14)$$

$$f_d(\vec{x}_i, \vec{\beta}) = \frac{e^{a_i + x'_{id}\beta'_d}}{1 + e^{a_i + x'_{id}\beta'_d}} \quad (15)$$

Along these lines, the single feature optimization process can be characterized as learning a single feature to "correct" an earlier logistic model 130.

Figure 5:
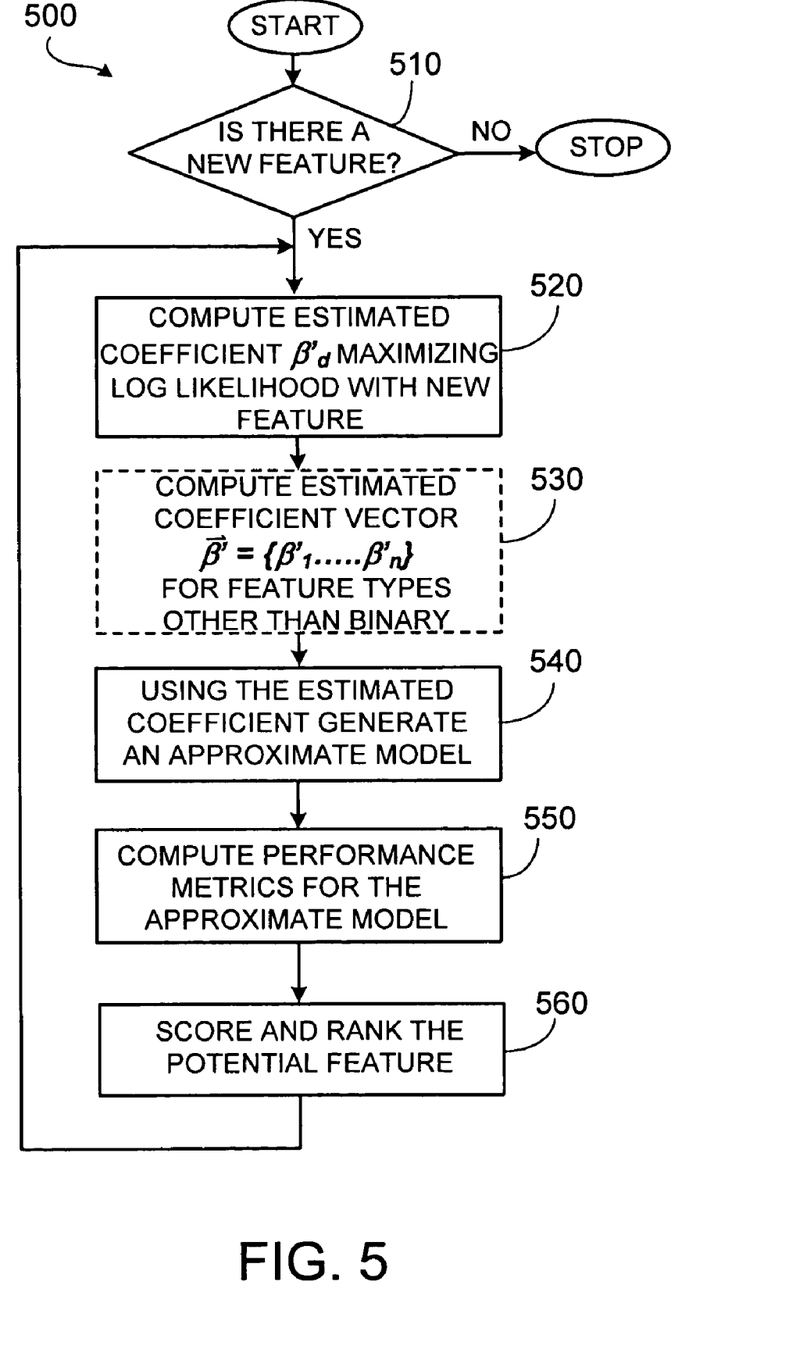
FIG. 5 is an flowchart illustrating an example single feature optimization process.

FIG. 5 illustrates an example single feature optimization (SFO) process 500 for evaluating potential features 410 to be added to a logistic model 130. The feature selection component 135 considers a new feature 405 to be added to the logistic model 130. (Step 510) For example, in connection with Internet images 140, the new feature 300 may be the image URL 300f (see FIG. 3). As described above, the feature selection component 135 computes an estimated coefficient, $\beta'_d$, corresponding to the new feature 405. (Step 520) In some examples, the coefficient is computed by optimizing, i.e., maximizing a loglikelihood measure of the data using the new feature.

In some examples, feature types other than binary can occur in the data records 205. In fact, many real-world problems typically contain categorical or continuous attributes that are potential features 410 to be added to the logistic model 130. Accordingly, the feature selection component 135 computes an estimated coefficient vector, $\vec{\beta}'$, for feature types other than binary. (Step 530)

As described above, these features can be transformed into a series of disjoint binary features belonging to a single logical grouping called a feature class. In some implementations, such a transformation is particularly well suited for the single feature optimization process 500. Since all of the other coefficients corresponding to the existing features 430 are held fixed, each feature of the feature class can be optimized independently, and later combined to form the complete approximate model 420. Further, each of these optimizations only needs to run over those data records 205 containing the relevant feature.

For an categorical attribute having an arity A (i.e., A discrete values) that has been exploded into $\vec{x}'=\{\vec{x}'_1, \ldots, \vec{x}'_A\}$, a vector of estimated coefficients corresponding to the feature class, $\vec{\beta}'=\{\vec{\beta}'_1, \ldots, \vec{x}'_A\}$, is computed by maximizing, for example, the loglikelihood function shown in expression (16) independently for each $0<d<A$.

$$\sum_{i: x'_{id}=1}\left(y_i \ln f_d(\vec{x}_i, \vec{\beta}) + (1 - y_i)\ln\left(1 - f_d(\vec{x}_i, \vec{\beta})\right)\right) \quad (16)$$

In this manner, the problem of evaluating large arity categorical attributes is divided into a series of smaller independent optimizations.

The feature selection component 135 generates an approximate model 420 based on the newly learned estimated coefficient, $\beta'_d$. (Step 540) The feature selection component 135 then evaluates a performance metric for the approximate model 420. The performance metric can include, for example, a loglikelihood measure, an area-under-curve metric, or a prediction error measure. (Step 550) The potential features 410 are scored and ranked based on the performance metric. (Step 560) For example, potential features 410 can be scored based on loglikelihood as shown by expression (17), where X represents a training set or test set of data records 205.

$$\text{score}(\beta'_d) = L(X, \vec{\beta}^+) \quad (17)$$

In some examples, as the number of data records 205 in the training set increases, the single feature optimization process 500 can involve non-trivial computations. For example, during each step of the Newton's method described above, all data records 205 that contain the new feature 405 being evaluated must be considered. This process can be simplified further by using an approximate optimization based on histograms.

The approximate optimization based on histograms can result in significant savings for problems with a large number of data records 205. In some implementations, further savings can be achieved by using sparse representation and efficient binning schemes. In some example implementations, a sparse representation is used such that only the histogram bins that contain a non-zero count (along with a bin number) are stored so that bins with zero counts do not have to be stored. In some example implementations, an efficient binning scheme can be used that sets the bin widths such that each bin includes approximately the same count as another bin.

Accordingly, instead of performing the optimization directly over the data records 205, a histogram over the predicted probabilities is formed, and used as a basis for deriving the approximate model 420. For example, two histograms with an equal number of bins, B, for each attribute are stored in, for example, the memory unit 115. Each bin tracks a number of data records 205 falling into a predetermined range of predicted probabilities, $N_b$, and also, a number of data records 205 that have positive outcomes, $N_{+b}$.

In some implementations, an original activation value, $a = \beta' \cdot \vec{x}$, that produces a midpoint probability of a bin $p_b$, is also stored along with the histogram bins. In some examples, this activation is derived as shown in expression (18) below.

$$a_b = \log\left(\frac{p_b}{1 - p_b}\right) \quad (18)$$

From the activation, $a_b$, a modified predicted probability that accounts for the new feature 405 can be computed as shown in expression (19).

$$p'_b = \frac{e^{a_b + \beta'_d}}{1 + e^{a_b + \beta'_d}} \quad (19)$$

In this manner, optimization of the estimated coefficient, $\beta'_d$, need only be performed over the bins in the histogram, using modified derivative computations as shown in expressions (20) and (21) below.

$$\frac{\partial L}{\partial \beta'_d} = \sum_{b=1}^{B} N_b^+ - p'_b \cdot N_b \quad (20)$$

$$\frac{\partial L}{\partial \beta'^2_d} = -\sum_{b=1}^{B} N_b \cdot p'_b \cdot (1 - p'_b) \quad (21)$$

Figure 6:
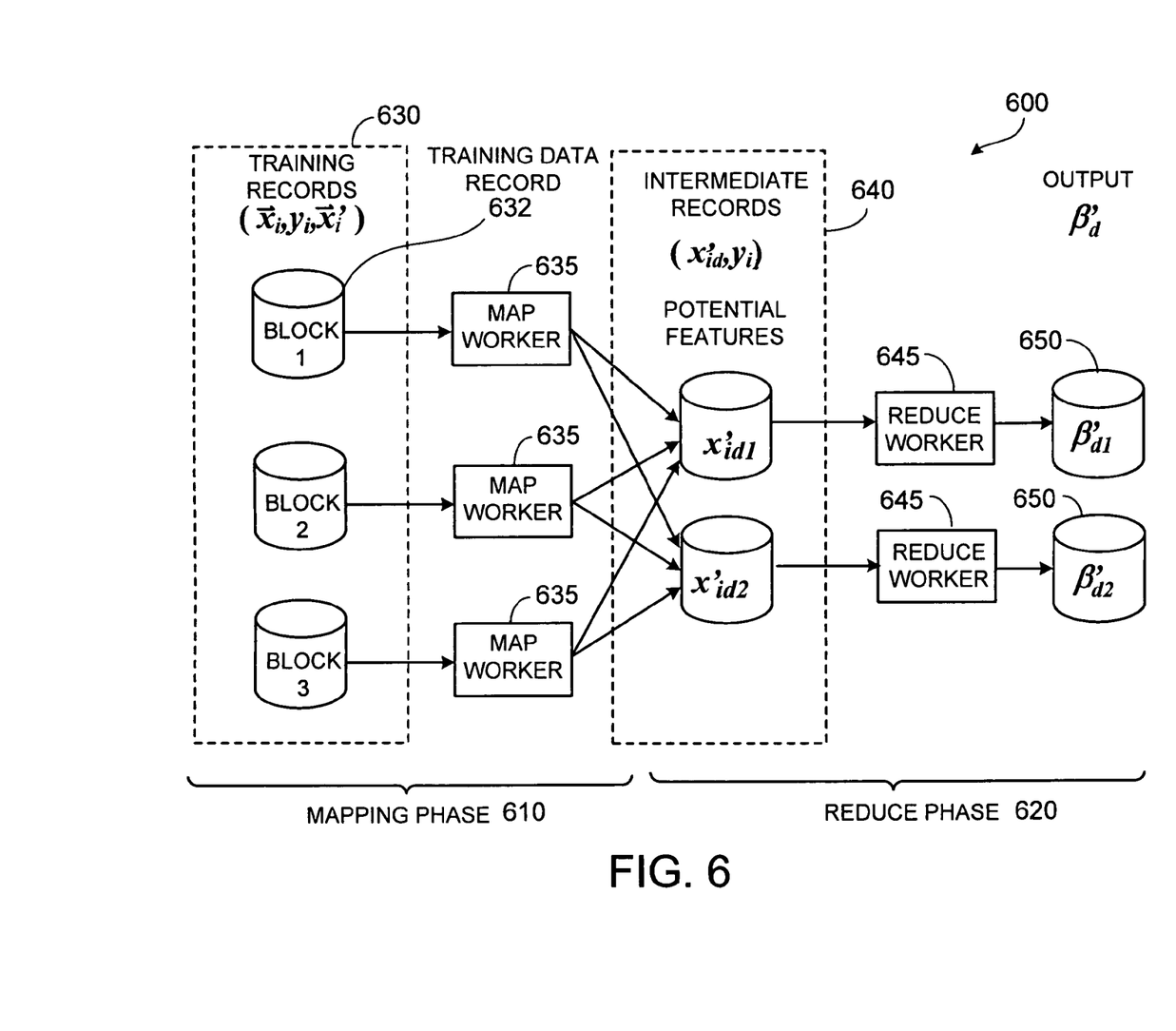
FIG. 6 is a block diagram of an example mapreduce scheme for the single feature optimization process.

In some examples, the single feature optimization process 500 can be implemented in the context of a mapreduce framework. Referring to FIG. 6, an example mapreduce framework scheme 600 includes two distinct phases, i.e., a mapping phase 610, and a reducing phase 620. In the mapreduce scheme 600 computations are carried out in parallel over training data records 630, and intermediate data records 640 (i.e., data records produced by the mapping phase 610 and grouped by potential features), respectively.

In the example mapreduce scheme 600, the training data records 630 (blocks 1-3) are shown as data blocks, each having at least one training data record, e.g., training record 632 in block 1. The intermediate data records 640 ($x'_{id1}$ and $x'_{id2}$) correspond to two potential features 405. It is understood that the mapreduce scheme 600 can be extended to evaluate many (e.g., billion) training data records 630 and potential features 410.

In the mapping phase 610, separate processors, referred to as map workers 635, operate on the training data records 630, ($\vec{x}_i, y_i, \vec{x}'_i$), to produce intermediate data records 640, ($x'_{id}, y_i, \hat{p}_i$) for each new feature 405, $x'_d$, in a training data record 630.

In the reduce phase 620, separate processors, referred to as reduce workers 645, operate on each of the intermediate data records 640, computing estimated coefficients, $\beta'_d$, corresponding to each new feature 405.

Figure 7:
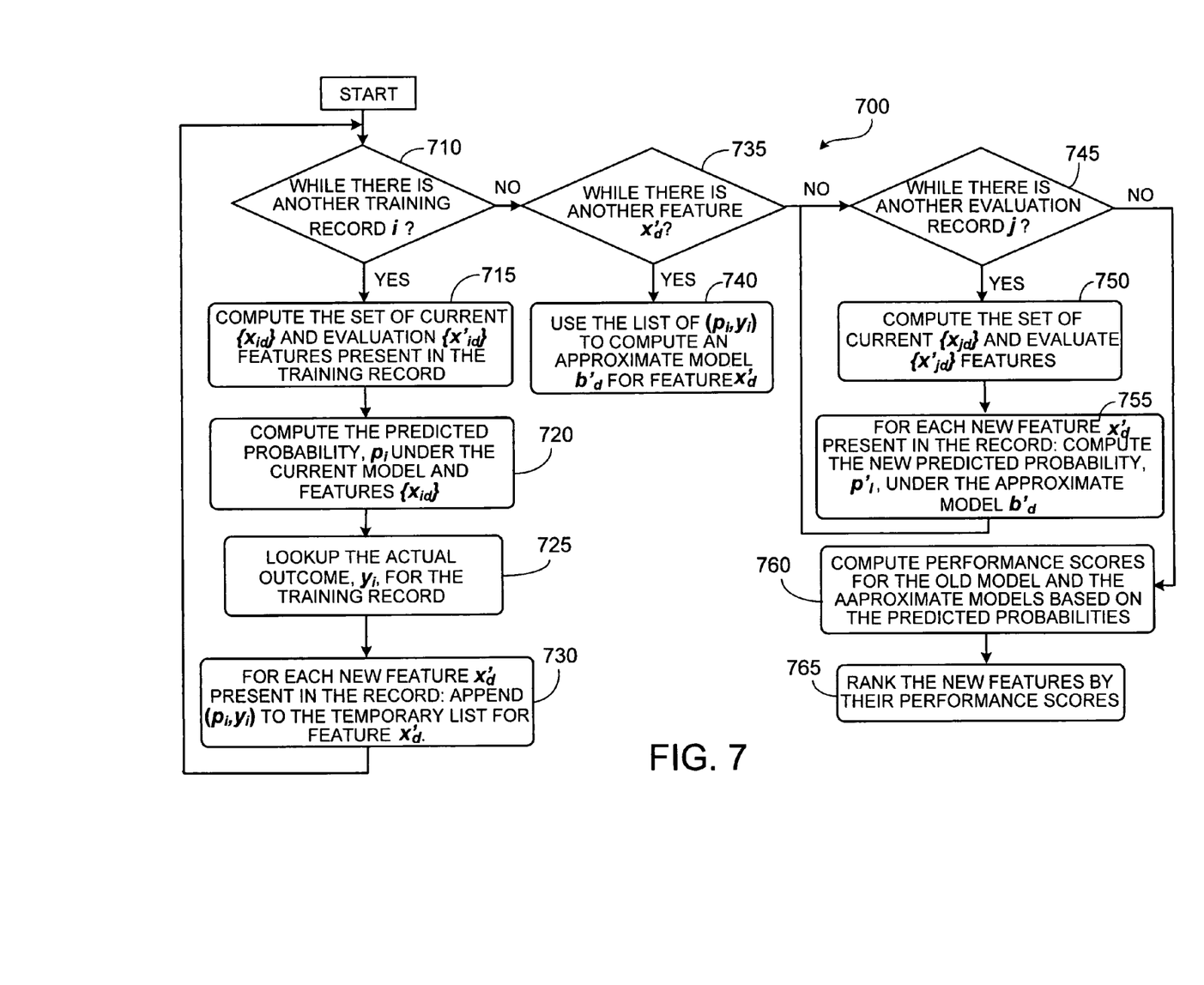
FIG. 7 is a flowchart illustrating parallelized single feature optimization process.

A parallel single feature optimization process 700 is shown is FIG. 7. The feature selection component 135 selects a training data record (i.e., data record, i) from a set of available data records. (Step 710) The feature selection component 135 computes a set of current features, $x_{id}$, and evaluation features, $x'_{id}$, in the data record, i. (Step 715) Based on the set of current and evaluation features, the feature selection component 135 fixes a logistic model 130 by determining coefficients $\beta_i$ for the current and evaluation features.

Using the values of the coefficients $\beta_i$ corresponding to the current features and evaluation features, the feature selection component 135 calculates a predicted probability $p_i$ that is associated with the logistic model 130. (Step 720) The feature selection component 135 then looks up the actual outcome $y_i$ for the logistic model 130 from the training data record i. (Step 725)

For each new feature $x'_d$ in the training data record i, the feature selection component 135 appends a predicted probability and actual outcome pair ($p_i$, $y_i$) to a list for the new feature d. (Step 730) The feature selection component 135 uses the list of predicted probability and actual outcome pairs ($p_i$, $y_i$) to determine an approximate model $b'_d$ for the new feature $x'_d$. (Steps 735-740)

For each evaluation data record j, the feature selection component 135 computes a set of current features $x_{jd}$ and evaluation features $x'_{jd}$ in the evaluation record j. (Steps 745-750) For each new feature d in the evaluation record, the feature selection component 135 computes a new predicted probability $p'_i$ based on the approximate model $b'_d$. (Step 755)

The feature selection component 135 computes a performance score for the old logistic model 130 based on the predicted probability $p_i$ and performance scores for the approximate models $b'_d$ based on the predicted probabilities $p'_i$. (Step 760) The feature selection component 135 ranks the new features based on a comparison of the performance scores of the approximate models with the performance score of the old logistic model 130. (Step 765)

The computer system 100 of FIG. 1 that is configured to implement a machine learning module 120 can include a processing unit and memory. The memory can include databases, disk drives, tape drives, etc., or a combination thereof. A random access memory can be implemented as a work area to store data used during execution of the logistic regression module 120 in the processing unit. A read only memory can be implemented to function as a program memory for storing instructions associated with the logistic regression module 120 executed in the CPU 110. Input/output devices can include any of a keyboard, a mouse, a liquid crystal display (LCD), a cathode ray tube (CRT) display, or a printer.

Various implementations of the machine learning module 120 can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including but not limited to at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including but not limited to a machine-readable medium that receives machine instructions as a machine-readable signal. The term "machine-readable signal" refers to any signal used to provide machine instructions and/or data to a programmable processor.

To provide for interaction with a user, the machine learning module 120 can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including but not limited to acoustic, speech, or tactile input.

The machine learning module 120 can be implemented in a computing system 100 that includes a back end component (e.g., as a data server), or that includes a middleware component (e.g., an application server), or that includes a front end component (e.g., a client computer having a graphical user interface or a Web browser through which a user can interact with an implementation of the machine learning module 120), or any combination of such back end, middleware, or front end components.

The components of the system 100 can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Other embodiments are within the scope of the following claims.

What is claimed is:

1. A method performed by a computer, comprising:
receiving a selection of a potential feature from a plurality of potential features for inclusion in a model, the model comprising existing features;
generating an approximate model comprising the model and the potential feature, wherein values of the existing features in the model are held constant in the approximate model;
computing a performance metric of the approximate model; ranking, based on the performance metric, the potential feature relative to other potential features in the plurality of potential features for inclusion in the model; and
determining, based on ranking, whether the potential feature is included in the model.

2. The method of claim 1, wherein generating the approximate model comprises:
computing a likelihood measure as a function of values of predicted probabilities and observed outcomes corresponding to the model; and
deriving, based on computing, estimated coefficient for the potential feature.

3. The method of claim 1, further comprising deriving estimated coefficients for a predetermined set of the plurality of potential features.

4. The method of claim 1, further comprising:
determining that the potential feature comprises a non-binary categorical feature; and
transforming the potential feature into a feature class having a plurality of independent binary features.

5. The method of claim 4, further comprising selecting records comprising the potential feature, from a set of data records for the model.

6. The method of claim 1, wherein generating comprises:
generating the approximate model based on use of a one dimensional heuristic single feature optimization over the potential feature to estimate an optimum coefficient corresponding to the potential feature.

7. The method of claim 1, wherein the performance metric is selected from a group comprising one or more of an area under curve metric, a log-likelihood measure, and a measure of prediction error.

8. The method of claim 1, further comprising:
generating a histogram based on values of predicted probabilities associated with the plurality of potential features; and
wherein generating the approximate model comprises:
generating the approximate model based on the histogram.

9. A system comprising:
one or more processors; and
one or more machine-readable media configured to store instructions that are executable by the one or more processors to perform operations comprising:
receiving a selection of a potential feature from a plurality of potential features for inclusion in a model, the model comprising existing features;
generating an approximate model comprising the model and the potential feature, wherein values of the existing features in the model are held constant in the approximate model;
computing a performance metric of the approximate model;
ranking, based on the performance metric, the potential feature relative to other potential features in the plurality of potential features for inclusion in the model; and
determining, based on ranking, whether the potential feature is included in the model.

10. The system of claim 9, wherein generating the approximate model comprises:
computing a likelihood measure as a function of values of predicted probabilities and observed outcomes corresponding to the model; and
deriving, based on computing, estimated coefficient for the potential feature.

11. The system of claim 9, wherein the operations further comprise:
deriving estimated coefficients for a predetermined set of the plurality of potential features.

12. The system of claim 9, wherein the operations further comprise:
determining that the potential feature comprises a non-binary categorical feature; and
transforming the potential feature into a feature class having a plurality of independent binary features.

13. The system of claim 9, wherein the operations further comprise:
  selecting records comprising the potential feature, from a set of data records for the model.

14. The system of claim 9, wherein generating comprises:
  generating the approximate model based on use of a one dimensional heuristic single feature optimization over the potential feature to estimate an optimum coefficient corresponding to the potential feature.

15. The system of claim 9, wherein the performance metric is selected from a group comprising one or more of an area under curve metric, a log-likelihood measure, and a measure of prediction error.

16. One or more machine-readable media configured to store instructions that are executable by one or more processors to perform operations comprising:
  receiving a selection of a potential feature from a plurality of potential features for inclusion in a model, the model comprising existing features;
  generating an approximate model comprising the model and the potential feature, wherein values of the existing features in the model are held constant in the approximate model;
  computing a performance metric of the approximate model;
  ranking, based on the performance metric, the potential feature relative to other potential features in the plurality of potential features for inclusion in the model; and
  determining, based on ranking, whether the potential feature is included in the model.

17. The one or more machine-readable media of claim 16, wherein generating the approximate model comprises:
  computing a likelihood measure as a function of values of predicted probabilities and observed outcomes corresponding to the model; and
  deriving, based on computing, estimated coefficient for the potential feature.

18. The one or more machine-readable media of claim 16, wherein the operations further comprise:
  deriving estimated coefficients for a predetermined set of the plurality of potential features.

19. The one or more machine-readable media of claim 16, wherein the operations further comprise:
  determining that the potential feature comprises a non-binary categorical feature; and
  transforming the potential feature into a feature class having a plurality of independent binary features.

20. The one or more machine-readable media of claim 16, wherein the operations further comprise:
  selecting records comprising the potential feature, from a set of data records for the model.

* * * * *